United States Patent [19]

Sweeney

[11] 4,243,777

[45] Jan. 6, 1981

[54] POLYPYRROLIDONE ALLOYS

[75] Inventor: W. Alan Sweeney, Larkspur, Calif.

[73] Assignee: Chevron Research Company, San Francisco, Calif.

[21] Appl. No.: 930,945

[22] Filed: Aug. 4, 1978

[51] Int. Cl.³ .............................................. C08L 77/02
[52] U.S. Cl. ..................................... 525/425; 525/432
[58] Field of Search ................. 260/857 TW, 857 PE; 525/425, 432

[56] References Cited

U.S. PATENT DOCUMENTS

| | | | |
|---|---|---|---|
| 3,097,181 | 7/1963 | Glickman | 260/857 TW |
| 3,683,046 | 8/1972 | Jarovitsky | 260/857 TW |
| 3,721,652 | 3/1973 | Barnes | 528/326 |
| 4,151,221 | 4/1979 | Backsal | 260/857 PE |

FOREIGN PATENT DOCUMENTS

| | | | |
|---|---|---|---|
| 47-25158 | 7/1972 | Japan | 260/857 TW |
| 50-12325 | 2/1975 | Japan . | |
| 50-12328 | 2/1975 | Japan . | |

*Primary Examiner*—Paul Lieberman
*Attorney, Agent, or Firm*—D. A. Newell; T. G. DeJonghe; L. S. Squires

[57] ABSTRACT

Intimate alloys of polypyrrolidone and hydrophobic linear polyesters and polyamides and processes for preparing such alloys. The intimate alloys comprise a major portion of polypyrrolidone and a minor amount of certain hydrophobic linear polymer additive and are characterized by improved fiber-textile properties. The intimate alloys are prepared by coprecipitation or by polymerizing polypyrrolidone from a mixture containing 2-pyrrolidone, alkaline catalyst and finely divided polymer additive.

6 Claims, No Drawings

POLYPYRROLIDONE ALLOYS

BACKGROUND OF THE INVENTION

1. Field of the Invention

This invention relates to intimate polymer alloys comprising a major amount of polypyrrolidone and a minor amount of certain linear polyesters and/or polyamides and to processes for preparing such alloys. In a further aspect, this invention relates to processes for preparing such polymer alloys wherein 2-pyrrolidone is polymerized in the presence of the polymer additive. In a still further aspect, this invention relates to processes for preparing alloys of polypyrrolidone and hydrophobic linear polyesters and polyamides via the coprecipitation of polypyrrolidone and the polymer additive from a suitable solvent.

2. The Prior Art

Poly-2-pyrrolidone (also known as nylon-4) is a polymer composed of repeating structure units of the formula:

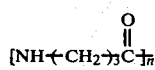

Polypyrrolidone can be used for making films, sheets, shaped and molded articles, but is primarily of interest for its filament properties. The polymer can be formed into filaments having substantial orientation along the filamentary axis, high tensile strength, and also, because of its hydrophilic properties, closely resembles cotton and silk. In some applications, however, nylon-4 is too hydrophilic, i.e., it is sensitive to a high-humidity environment. Garments may lose their shapes and attain a "clammy" feel. Thus, it would be desirable to produce a polypyrrolidone composition which would obviate or substantially reduce these deficiencies.

U.S. Pat. No. 3,097,181 broadly discloses compositions containing a ratio of polypyrrolidone to non-polypyrrolidone polyamide of from 1:20 to 100:1. This patent is primarily directed to nylon-66 and nylon-6 compositions and describes these nylons as hydrophobic materials. Where the composition is primarily non-polypyrrolidone polyamide, the composition is described as having improved water absorption and dyeing characteristics as compared with the polyamide. Where the composition is primarily polypyrrolidone, the composition is described as having improved fiber forming properties as compared with polypyrrolidone. Although nylon-66 and nylon-6 are described as hydrophobic by this patent, it should be noted that these materials actually have moisture regain values under standard conditions of about 4-4.5 wt% and 4.3 wt% respectively.

U.S. Pat. No. 3,097,181 also broadly teaches that polypyrrolidone may be used in amounts of 1 to 50% with other hydrophobic materials to modify the properties of such materials or such materials may be used in amounts of 1 to 50% with polypyrrolidone. Such materials are described as including the polyesters, e.g. polyethylene terephthalate (Dacron); the acrylics, i.e., polyacrylonitrile-containing materials (e.g., Acrilan, Creslan, Dynel, Orlon, and the like); the polyvinyl resins, e.g., polyvinyl chloride, polyvinylidene chloride, etc.; the polyolefins, e.g., polyethylene and polypropylene; cellulose triacetate; and the like. The only method of preparing the compositions disclosed by this patent is shown in the examples. In the examples, compositions containing polypyrrolidone and either nylon-66 or -6 are prepared by melt-extruding blended powders of these materials. This method is not effective for many of the polymers listed.

Generally, polymer blends are made by hot-melt mixing of particles of each polymer using various mechanical devices such as mills, blenders and extruders to produce the desired degree of mixing. The starting particles are usually of the order of 2 to 6 mm in diameter (weighing 10 to 200 mg). In order to obtain a very well mixed or "intimate" alloy, considerable mixing time, e.g., greater than about 15 minutes, or very high shear rates is required. Such procedures are not satisfactory for poly-2-pyrrolidone because, even though poly-2-pyrrolidone can be melt-spun to high-quality fibers, the residence time must be short, e.g., less than 10 minutes, to avoid excessive thermal decomposition. Similarly, some melt compounding can be done prior to the melt spinning if the residence time is short. If too much decomposition occurs, the molecular weight will be too low, fiber strength will suffer, and filament breaks will occur.

Poly-2-pyrrolidone itself is generally prepared by the alkaline-catalyzed polymerization of 2-pyrrolidone, preferably in the presence of a catalyst comprising the reaction product of a 5–7 membered-ring lactamate and an alkali or alkaline earth metal hydroxide, etc. and a carbon dioxide activator; such as, for example, described in U.S. Pat. No. 3,721,652.

U.S. Pat. No. 3,683,046 discloses what is described as an improvement on the process described in U.S. Pat. No. 3,721,652 and teaches that carrying out the polymerization in the presence of a particulate material tends to increase reproducibility and often produces faster polymerization rates and higher-molecular-weight polymers. Particulate materials suggested by this patent are alkali metal bicarbonates; alkali metal carbonates; particulate charcoal, and particulate material obtained from a partially polymerized reaction mass prepared by polymerizing 2-pyrrolidone in the presence of an alkali polymerization catalyst and carbon dioxide.

SUMMARY OF THE INVENTION

Broadly, the present invention pertains to the discovery of a new polymer composition (i.e., an intimate alloy of polypyrrolidone and a minor amount of certain hydrophobic linear polyesters or polyamides) which can be extruded into high quality textile fibers having improved moisture-regain properties, and to the discovery of specialized processes for advantageously making such intimate alloys.

In one embodiment, the composition comprises an intimate alloy of poly-2-pyrrolidone and from 2 to 40% by weight of certain high-molecular-weight linear hydrophobic polymer additives, i.e., polyesters and/or polyamides, having a number average molecular weight in the range of from 15,000 to 50,000, a melting point in the range of about from 150° to 300° C. and a moisture regain of 0.2 to 2.5% wt. The polymer additive is dispersed in finely divided form throughout the poly-2-pyrrolidone.

In another embodiment, the invention comprises a process for preparing such intimate alloys by co-precipitating a major amount of poly-2-pyrrolidone and the requisite amount of such polyesters and/or polyamides from a suitable solvent.

In still another embodiment, the invention comprises a process for preparing such intimate alloys which comprises polymerizing 2-pyrrolidone in the presence of an alkaline catalyst and the requisite amount of finely divided hydrophobic polymer additive.

FURTHER DESCRIPTION OF THE INVENTION AND PREFERRED EMBODIMENTS

The poly-2-pyrrolidone alloy of the present invention comprises from about 2 to 40% by weight, preferably 3 to 30% by wieght, of certain specific polyamides and/or polyesters, as will be specified hereinbelow, dispersed through said poly-2-pyrrolidone in the form of very small discrete particles. (Weight percent is based on the sum of the poly-2-pyrrolidone and the polyamide and/or polyester.) Mixtures of such polyesters and polyamides can also be used, though typically it is more convenient to use a single polymer additive.

The polymer additives used in this invention fall into a narrow group. They must be high-molecular-weight, linear, heat-stable polymers containing ester or amide linkages whose melting point is between about 150° and 300° C., preferably between about 180° and 290° C. Their number average molecular weight should be about from 15,000 to 50,000, as determined by standard techniques such as osmometry or gel permeation chromatography. Typically these additive polymers can themselves be melt-spun into fibers. By virtue of these qualities, the additive is substantially compatible with nylon-4 under melt-spinning conditions and does not impair the fiber-forming quality of the nylon-4 itself. The polymer additive must be quite hydrophobic, i.e., having a moisture regain of about from 0.2 to 2.5, and preferably 0.3 to 2, weight percent, measured at standard conditions. (The term "standard conditions" refers to 70° F. and 65% relative humidity.) If the moisture regain is above 2.5, the moisture regain problem is not sufficiently reduced and, if moisture regain of the additive is below 0.2, the polymer additive will not be sufficiently compatible in the melt.

To contribute hydrophobicity on the one hand and melt compatibility on the other, the polyamide additive preferably should have about 1 amide linkage per 6 to 11 aliphatic carbon atoms. The polyester additive preferably should have about 1 ester group per 3 to 7 aliphatic carbon atoms. In each case, aromatic moieties could be present and each aromatic carbon counted as two-thirds of an aliphatic carbon. Suitable polymer additives include, for example, nylons-610, -612, and -12; the polyglycol terephthalates of ethylene glycol, 1,4-butanediol; 1,4-dihydroxymethyl cyclohexane; and the like, and compatible mixtures thereof. Linear copolymers containing a mixture of ester and amide groups or urethane or urea linkages, having the requisite molecular weight, melting point and moisture regain properties, could also be used.

The poly-2-pyrrolidone used in the present alloy should also have a weight average molecular weight above 15,000, preferably above 20,000, and typically has a weight average molecular weight of about from 20,000 to 500,000.

By the term "intimate alloy" is meant a solid physical mixture of the polymer additive and poly-2-pyrrolidone in which the particulate regions of polymer additive are small enough to be reduced to the micron range or smaller after melt spinning. Attainment of a uniform mixture of small discrete particles of the polymer additive in nylon-4 is essential to this invention. Thus these particles should have a particle size in the range of about from 0.01 to 1000 microns, preferably less than about 750 microns, and more preferably less than about 300 microns, so that the subsequent melt-extrusion process will convert the particles into much smaller particles whose cross-sections are small compared with the cross-section of a fine-denier filament. Save for the reduction in size, the actual fate of these particles during the subsequent melt-spinning operation is not known, but it is found that uniform, high-quality fibers can be obtained from the intimate alloys of the present invention. The composition and particle size of the polymer additive within the composition of the invention, including filaments spun therefrom, can be checked by dissolution of the polypyrrolidone in highly polar solvents such as formic acid, followed by separation and analysis for particle size and quantity of the insoluble hydrophobic additive. Also, in the case where the alloy is prepared by polymerizing pyrrolidone in the presence of the polymer additive, the alloy can also contain small amounts (usually less than 1% by weight, based on the weight of polypyrrolidone and the polymer additive) of block copolymer made by polymerizing 2-pyrrolidone onto segments with the polymer additive. The polymer alloy can also contain small amounts of other additives, typically less than 1%, such as delusterants, pigments, stabilizers, and the like.

The intimate alloys, of the present invention, can be made into fibers, films, and other shaped articles by a variety of plastic molding techniques, such as extrusion and form-molding techniques, etc. The intimate alloys are especially useful for high-quality textile fibers because of their desirable water absorbency and increased wet-strength and reduced wet-stretching, and can be melt-spun into such textile fibers. Such melt-spinning is typically conducted at temperatures in the range of about from 260°–290° C., although with the use of plasticizers lower temperatures can be used. Garments made from the alloy suffer substantially less stretching during washing than garments made from polypyrrolidone itself.

In accordance with one embodiment of the process of the invention, the polymer alloy can be prepared by coprecipitating the requisite amount of poly-2-pyrrolidone and the polymer additive (i.e., 2 to 40 wt% based on total polymer) from a suitable solvent. For example, this can be conveniently effected by dissolving poly-2-pyrrolidone and the polymer additive in a suitable solvent, in which both materials are soluble, at a higher temperature, and then reducing the temperature of the solution to reduce solubility and effect coprecipitation. Suitable solvents which can be used include, for example, 2-pyrrolidone, N-methylpyrrolidone, cresol, benzyl alcohol, and the like, and compatible mixtures thereof. Very active acidic solvents for nylon-4 such as formic acid or sulfuric acid are not preferred, because they are not good solvents for the polymer additives and they are difficult to remove for recycle.

For example, using 2-pyrrolidone as the solvent, the poly-2-pyrrolidone and polymer additive can be conveniently dissolved in the 2-pyrrolidone at temperatures in the range about from 150° C. to 200° C. The intimate alloy coprecipitate can then be obtained by reducing the temperature of the solution to below about 125° C., preferably in the range about from 30° C. to 100° C. Optimum coprecipitation temperatures will, of course, depend upon the specific solvent used and determined by reference to solubility tables or routine experimentation.

Also, because poly-2-pyrrolidone is liable to thermal degradation, the use of solvents at elevated temperatures should be carefully controlled to avoid excessive nylon-4 thermal degradation. Generally, the time at temperatures above 170° C. should be less than about 30 minutes. The presence of water in the *hot* solution should also be avoided since nylon-4 and/or the polymer additive may be hydrolyzed by water at higher temperatures.

In another mode of the coprecipitation embodiment, the poly-2-pyrrolidone and polymer additive can be dissolved in a suitable solvent and the resulting solution then combined with a miscible carrier liquid in which both polymers are insoluble, causing the polymer alloy to coprecipitate. Suitable solvent-carrier liquid combinations which can be used include, for example, 2-pyrrolidone and water; pyrrolidone and methanol; N-methyl-2-pyrrolidone and methanol; cresol and methanol; and the like. It has been found that good results can be obtained by using the solvent-carrier liquid combination of pyrrolidone and water, provided that the temperature of the liquid composition is sufficiently low to avoid the water hydrolysis problems noted above. Good results can be obtained by using temperatures in the range of about 20 to 150, preferably about from 30° to 120° C.

The coprecipitate can be recovered from the cooled solvent or carrier liquid by conventional solid-liquid separation and isolation means such as, for example, centrifugation, filtration, evaporation, decantation followed by evaporation, and the like. Preferably, any water and/or residual solvent left in the intimate alloy is substantially removed (e.g., evaporated) to facilitate melt-extrusion or melt-spinning operations.

In a further embodiment of the invention, the polymer alloy can be prepared by polymerizing pyrrolidone in the presence of the finely divided polymer additive using an alkaline catalyst. With the exception of the addition of the finely divided polymer additive, the polymerization can be effected by following any suitable base-catalyzed 2-pyrrolidone polymerization procedure. A number of suitable polymerization procedures are, for example, described by U.S. Pat. No. 3,721,652.

The polymerization can be conveniently effected by polymerizing a mixture of pyrrolidone monomer, alkaline lactamate (catalyst), and preferably alkaline carboxylactamate (activator), and the polymer additive preferably in a suitable organic solvent or carrier liquid. Typically, excess pyrrolidone is used as the solvent; however, other inert organic solvents or inert organic carrier liquids, i.e., inert organic non-solvents such as hexane or heptane, and the like, could also be used. Also as is well recognized, the polymerization is preferably conducted under anhydrous or substantially anhydrous conditions, i.e., the reaction mixture should contain less than 0.5% water, based on the weight of pyrrolidone, and preferably less than about 0.3%. Optimum polymerization conditions will vary with the particular catalyst system used; however, typically polymerization temperatures and polymerization times in the range of about from 15° C. to 100° C., preferably 25° C. to 70° C., and polymerization times of about from 4 to 100 hours, and preferably from about 8 to 72 hours, are used. Generally, best results are obtained using polymerization temperatures in the range from about 40° C. to 60° C. and polymerization times of about from 8 to 48 hours. Optimum polymerization times will, of course, vary with polymerization temperatures used and generally, within the polymerization temperature range, longer polymerization times will be used where temperatures above or below the optimum polymerization temperature are used.

In a preferred mode of the polymerization embodiment, an alkali metal hydroxide is added to excess 2-pyrrolidone in an amount of about from 0.5 to 30 mol percent, preferably about from 1 to 20 mol percent, based on the weight of 2-pyrrolidone. Best results are typically obtained using about 10 mol percent of the alkali metal hydroxide based on total 2-pyrrolidone. (The term "total 2-pyrrolidone" refers to all of the 2-pyrrolidone in the system and includes the total 2-pyrrolidone charged to the system, in whatever form, and includes 2-pyrrolidone provided as solvent, that which is initially polymerized, and that contained in the 2-pyrrolidonate catalyst or in the 2-pyrrolidonate forming an adduct or complex with an activator or initiator, as well as any additional 2-pyrrolidone charged to the reactor).

The alkali metal hydroxide reacts with the 2-pyrrolidone to form a solution of alkali metal pyrrolidonate and by-product water in 2-pyrrolidone. The solution is then dehydrated to remove this water and any other water impurities until the pyrrolidone solution contains less than about 0.5% water, and preferably less than about 0.3% water.

The dehydrated solution is then contacted with carbon dioxide and/or sulfur dioxide. The carbon dioxide or sulfur dioxide is generally referred to as an activator and is primarily added to obtain a higher-molecular-weight product. The carbon dioxide or sulfur dioxide forms an adduct with the alkali metal 2-pyrrolidonate. Typically, about from 0.3–30 mol percent based on the mol weight of the total 2-pyrrolidone, and preferably from 0.2 to 10 mol percent, of carbon dioxide and/or sulfur dioxide. (Based on the alkali metal 2-pyrrolidonate present in the solution, this corresponds to a mol percent of about from 5% to 80%, and preferably 10 to 60 mol percent). Best results are obtained using about from 1 to 5 mol percent based on total 2-pyrrolidone. Generally, lower amounts of sulfur dioxide are used than carbon dioxide.

Best results are more conveniently obtained using carbon dioxide as the activator and potassium hydroxide as the alkali metal hydroxide. Other alkali metal hydroxides could also be used; for example, sodium hydroxide and lithium hydroxide. The carbon dioxide and/or sulfur dioxide is conveniently added to the solution by the simple expedient of bubbling the carbon dioxide through the solution, but could also be supplied by compatible compounds which break down to liberate carbon dioxide and/or sulfur dioxide.

The desired amount of particulate polymer additive is generally added to the mixture either immediately prior to the addition of carbon dioxide and/or sulfur dioxide or immediately thereafter. The amount of additive added is adjusted to provide a polymer alloy product, after polymerization to a certain pyrrolidone conversion level, which has the desired amount of polymer additive within the 2 to 40 wt% range. The polymerization is stopped when the pyrrolidone conversion reaches that level. The polymer additive could also be added to the initial pyrrolidone monomer prior to the addition of the alkali metal hydroxide. The initial polymer additive is typically supplied commercially as a pellet and, hence, must be converted to a finely divided particulate form prior to use in the present process. This can be conveniently effected by grinding the polymer into a finely divided powder. The finely divided particulate additive should have a particle size in the range of about from 0.01 to 1000 microns, and preferably about from 0.05 to 750 microns, as determined by routine particle counting or microscopic techniques.

A particularly attractive procedure is to dissolve and precipitate the polymer additive from a suitable solvent, which is innocuous in the polymerization system, and then add the precipitate-solvent physical mixture, or that mixture with part of the solvent removed, to the 2-pyrrolidone-catalyst polymerization mixture before significant polymerization has occurred. Suitable solvents which can be used include, for example, 2-pyrrolidone, N-methyl-2-pyrrolidone, benzyl alcohol, and the like, and mixtures thereof. 2-pyrrolidone is the preferred solvent, since, as it is the same compound as is undergoing polymerization, it is merely additive to the system and does not require specialized recovery procedures.

Although the primary purpose of the polymer additive is to form applicant's novel intimate polymer alloy, it has also been unexpectedly found that the polymer addition has an accelerating effect on the polymerization reaction. For example, it has been observed that the polymerizing fluid mixture sets up to a gel in a considerably shorter time than the corresponding polymerization without the polymer additive. This is a distinct advantage, especially when settleable additives such as titanium dioxide are also present or when certain continuous polymerization procedures are employed. The reason for this increase in reaction rate is not clearly known. However, it is conjectured that the polymer additive acts as an accelerator, perhaps interacting with 2-pyrrolidone and leading to the formation of a small amount of block copolymer.

The polymerization processes and coprecipitation processes, of the invention, can be conducted as either batch processes or continuous processes, or semi-continuous processes, and can be carried out using different or additional solvents, or in the case of the polymerization process, also using additional catalysts, activators and/or accelerators. Where typical process condition ranges (e.g., temperatures, times, mol ratios, etc.) have been given, it should be appreciated that process conditions both above and below those ranges can also be used, though generally with poorer results and/or less economically. Also as used herein, the terms "pyrrolidone" and "polypyrrolidone" more accurately refer to 2-pyrrolidone and poly-2-pyrrolidone, respectively. The term "total polymer weight" refers to the combined weight of the polymer additive and poly-2-pyrrolidone and is the basis for which the percentage of additive in the alloy has been given herein.

PREPARATION AND EXAMPLES

A further understanding of the invention can be had from the following nonlimiting preparations and examples, wherein mesh sizes refer to United States standard mesh sizes.

PREPARATION 1

This preparation illustrates the polymerization of pyrrolidone without the incorporation of polymer additive.

In this preparation, 200 g (2.35 mols) of purified 2-pyrrolidone was placed in a flask equipped for vacuum distillation and fitted with a gas inlet tube. 15.4 g (0.235 mol, 10 mol percent based on 2-pyrrolidone) of 85.7% pure potassium hydroxide was added and the flask then swept dry with gaseous nitrogen. The mixture was placed under reduced pressure and heated to incipient distillation of pyrrolidone to remove water formed by the reaction of pyrrolidone and potassium hydroxide. The resulting solution was cooled to 30° C. and 3.1 g (0.07 mol, 3 mol percent based on total pyrrolidone) of carbon dioxide was bubbled into the solution, under vacuum. The flask was then brought to atmospheric pressure by the addition of dry gaseous nitrogen and the solution then poured into polymerization bottles and maintained at 50° C. for 24 hours. The solution was observed to gel after 60 minutes. The resulting hard, formed product was maintained at 5° C. for about 12 hours, then broken up, extracted with water to remove soluble impurities, and dried under vacuum. Based on total 2-pyrrolidone, a conversion of 50% was obtained, and as determined by the Gardner viscosity comparison method, the polymer product had an estimated weight average molecular weight of 460,000.

Gardner viscosity was determined by dissolving 0.5 gram of the polymer in 10 ml concentrated formic acid (90% by weight formic acid, 10% water). The viscosity of this solution was measured at room temperature (i.e., about 21° C.) on the Gardner viscosity scale by comparison with the Gardner viscosity standards; see "Physical and Chemical Examination, Paints, Varnishes, Lacquers and Colors", H. A. Gardner and T. T. Sward, 12th Ed. (1962), distributed by Gardner Laboratories Company Inc., Bethesda, Md.

EXAMPLE 1

This example illustrates the polymerization process of the present invention. In this example, the identical procedure was followed as in Preparation 1, with the exception that 12% by weight of polybutylene terephthalate in fine particulate form (less than 20 mesh) was added to the polymerization bottle immediately prior to being heated at 50° C. The polybutylene terephthalate was a commercial-grade polymer sold under the trademark Goodyear Vitel VFR4716A by the Goodyear Tire and Rubber Co. The polymer was obtained in pellet form, and then finely ground in a Whitey mill to less than about 20 mesh. Each particle weighed about 0.3 mg or less.

The polymerization mixture was observed to gel after 20 minutes. A 52%, by weight, based on the pyrrolidone, conversion of pyrrolidone was obtained after 24 hours. The polypyrrolidone product was determined by Gardner viscosity comparison (described in Preparation 1) to have a weight average molecular weight of about 430,000 and the alloy contained 19%, by weight, polybutylene terephthalate.

EXAMPLE 2

In this example, the same procedure as described in Example 1 was repeated twice, but using different concentrations of polybutylene terephthalate; i.e., 1 wt% and 17%, based on total 2-pyrrolidone. Also, because a different batch of 2-pyrrolidone (having a lower reactivity than the 2-pyrrolidone used in Preparation 1 and Example 1) was used, the polymerization was conducted for 48 hours instead of 24 hours; i.e., the mixture was heated in the polymerization bottles at 50° C. for 48 hours. A control was also run following the same procedure, using the same batch of 2-pyrrolidone, but without the polybutylene terephthalate additive.

The results are summarized in the following table wherein weight average molecular weight was determined by the Gardner viscosity comparison method described in Preparation 1.

TABLE I

| Reaction Mixture % Polybutylene Terephthalate | % Conversion[*1] | Mw[*2] × 10$^{-3}$ | Polymer Alloy % PBT |
|---|---|---|---|
| 0 | 38 | 375 | 0 |
| 1 | 37 | 355 | 2.6 |
| 17 | 59 | 85 | 26. |

[*1]Conversion of pyrrolidone to polypyrrolidone equals the weight of poly-2-pyrrolidone times 100 divided by the weight of total pyrrolidone added.
[*2]Weight average molecular weight.

As can be seen from Table I, the run using 17 wt% polybutylene terephthalate, produced a high conversion (i.e., of 59%) and once again showed the acceleration effect of adding the fine-particle polymer to a 2-pyrrolidone polymerization. However, the polymerization using only 1% polybutylene terephthalate showed no improvement over and was substantially equivalent to the control.

EXAMPLE 3

The same procedure as used in Example 1 was used in this example, except on a larger scale. In this example, 165 g of finely ground polybutylene terephthalate (less than about 35 mesh, particles weight about 0.02 mg or less) was placed in a ½-gallon plastic bottle. The bottle and contents were dried in a vacuum oven to less than 0.1% water. Carbonated potassium pyrrolidonate in pyrrolidone (1485 g), prepared as in Preparation 1, was added and the polymerization conducted at 50° C. for 20 hours. The polymerization mixture gelled in about 20 minutes. A conversion of pyrrolidone of 48% to a polymer having a weight average molecular weight of 290,000 (determined by the Gardner viscosity method described in Preparation 1) was obtained. The intimate alloy product contained about 19% polybutylene terephthalate.

EXAMPLES 4-7

These examples illustrate precipitation processes for converting various polymer additive materials to very fine particles by dissolving them in 2-pyrrolidone, at elevated temperatures, and then precipitating the additives as fine particles by reducing the temperature of the solution.

In these examples, 50 g of the polymer additive, indicated herein below in Table 2, was added to 950 g of 2-pyrrolidone at room temperature. The mixture was heated with stirring until the solution became clear. The solution was then cooled to precipitate the additive. The temperature at which the solution became clear, i.e., additive fully dissolved, and at which the polymer additive precipitated are given in Table 2, herein below:

Table II

| Additive | Clear Solution temp., °C. | Precipitation Temperature |
|---|---|---|
| Ex. 4 Polybutylene terephthalate | 170 | 130 |
| Ex. 5 Polyethylene terephthalate | 180 | 150 |
| Ex. 6 Polycyclohexane dimethyl terephthalate | 235 | <235 |

Table II-continued

| Additive | Clear Solution temp., °C. | Precipitation Temperature |
|---|---|---|
| Ex. 7 Nylon-12 | 155 | 120 |

The mixture was further cooled and filtered at about 50° C. to remove about 80% of the 2-pyrrolidone present, yielding a fine particulate additive wet with about 4 parts of pyrrolidone. This mixture is suitable for making an intimate alloy by the present polymerization process. The precipitate was observed to have fine particle size, estimated at about 10 microns.

Similar products are also prepared by quenching the hot solutions in water, followed by filtration, washing and drying.

EXAMPLE 8

This example illustrates the use of the precipitation technique of Examples 4 to 7 to make an intimate alloy directly by coprecipitation of nylon-4 with the polymer additive.

45 g of polybutylene terephthalate and 105 g of poly-2-pyrrolidone of weight average molecular weight 200,000 (determined by Gardner viscosity, see supra) were placed in 850 g of dry 2-pyrrolidone, heated to 180°-190° C. for 40 minutes with stirring to dissolve the polymers, and then precipitated by pouring into 2000 g of ice in a blender. The precipitate was repeatedly washed with water and dried at 150° C. Approximately 150 g of poly-2-pyrrolidone intimate alloy containing 30% polymer additive were recovered. The weight average molecular weight of the poly-2-pyrrolidone decreased to 155,000 (Gardner viscosity) which is still considered to be a very good pre-melt extrusion molecular weight.

EXAMPLE 9

In this example, the same procedure as described in Example 1 was followed except that the particulate polybutylene terephthalate was prepared by precipitation and had a particulate size smaller than that used in Example 1 (particle size estimated at about 10 microns).

Polybutylene terephthalate (20 g) was dissolved in 80 g of 2-pyrrolidone by heating to 185° C. The resulting solution was then cooled to 80° C. and 100 g of the carbonated potassium salt of 2-pyrrolidone dissolved in 2-pyrrolidone (described in Preparation 1) was added and stirred to a homogeneous mixture. The mixture gelled within 2-3 minutes and was cured for 48 hours at 50° C. Conversion of pyrrolidone to polymer was 72%. The polymer product had an weight average molecular weight of 25,000 (Gardner viscosity).

EXAMPLE 10

In this example, the procedure of Example 3 was followed but using nylon-612 in place of polyethylene terephthalate.

Dried nylon-612 (58 g) in fine particle form (particle size of less than about 35 mesh) was mixed with 1590 g of carbonated potassium pyrrolidonate in pyrrolidone. The polymerization was conducted at 50° C. for 44 hours and afforded a 58% conversion of the pyrrolidone to poly-2-pyrrolidone having a weight average molecular weight of 380,000 (Gardner viscosity). The intimate alloy product contained about 6% nylon-612.

Obviously, many modifications and variations of the invention, described hereinabove and below in the claims, can be made without departing from the essence and scope thereof.

What is claimed is:

1. A process for preparing a polymer alloy of poly-2-pyrrolidone and a linear polymer additive selected from the group consisting of polyesters, polyamides and mixtures thereof which comprises dissolving said poly-2-pyrrolidone for about from 2% to 40% by weight, based on total polymer, of said polymer additive in an inert organic solvent, thereby forming a solution of said poly-2-pyrrolidone and said polymer additive in said solvent and coprecipitating, said poly-2-pyrrolidone with said polymer additive from said solvent, thereby yielding an intimate coprecipitate polymer alloy, and wherein said polymer additive has a number average molecular weight of about from 15,000 to 50,000, a melting point of about from 150° to 300° C. and a moisture regain, measured at standard conditions, of from 0.2 to 2.5 %wt.

2. The process of claim 1 wherein said coprecipitation is effected by reducing the temperature of said solvent sufficiently to coprecipitate poly-2-pyrrolidone and said polymer additive.

3. The process of claim 2 wherein said solvent is 2-pyrrolidone and said coprecipitation is effected by cooling said solvent to a temperature below about 125° C.

4. The process of claim 1 wherein said coprecipitation comprises contacting said solution with an inert liquid in which said poly-2-pyrrolidone and said polymer additive are substantially insoluble.

5. The process of claim 4 wherein said poly-2-pyrrolidone is dissolved in a hot solvent and said coprecipitation is effected by quenching the hot solution in water at temperatures below about 100° C.

6. The process of claim 1 in which the polymer additive is polybutylene terephthalate.

* * * * *